US010722969B2

(12) United States Patent
Ulrich (10) Patent No.: US 10,722,969 B2
(45) Date of Patent: Jul. 28, 2020

(54) ENERGY CONSERVATION SYSTEM, METHOD, AND APPARATUS FOR USE WITH WELDING EQUIPMENT

(71) Applicant: Illinois Tool Works Inc., Glenview, IL (US)

(72) Inventor: Mark Ulrich, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 469 days.

(21) Appl. No.: 14/729,291

(22) Filed: Jun. 3, 2015

(65) Prior Publication Data

US 2016/0354855 A1    Dec. 8, 2016

(51) Int. Cl.
  *B23K 9/10* (2006.01)
  *B23K 9/095* (2006.01)
  *B23K 37/00* (2006.01)

(52) U.S. Cl.
  CPC .......... *B23K 9/1006* (2013.01); *B23K 9/0956* (2013.01); *B23K 9/1012* (2013.01); *B23K 37/00* (2013.01)

(58) Field of Classification Search
  CPC .... B23K 37/00; B23K 9/0956; B23K 9/1006; B23K 9/1012; B23K 9/095; B23K 9/1081
  USPC .......... 219/133, 134, 137 PS, 137.2, 137.31, 219/130.32, 130.01, 121.63, 121.64, 219/121.65, 121.66, 121.6; 340/5.73, 340/5.72; 290/40 B; 271/264
  See application file for complete search history.

(56) References Cited

U.S. PATENT DOCUMENTS

| 6,593,540 | B1 * | 7/2003 | Baker | B23K 26/0096 219/121.63 |
| 2002/0190044 | A1 * | 12/2002 | Leisner | B23K 9/1006 219/133 |
| 2004/0217846 | A1 * | 11/2004 | Konno | B60R 25/246 340/5.73 |
| 2008/0217846 | A1 * | 9/2008 | Shibagaki | B41J 13/0018 271/264 |

(Continued)

FOREIGN PATENT DOCUMENTS

DE    20 2008 018416    8/2013
JP    S62 199268    9/1987

OTHER PUBLICATIONS

International Search Report and Written Opinion, dated Jul. 12, 2016, in International application No. PCT/US2016/027278, filed Apr. 13, 2016.

*Primary Examiner* — Ibrahime A Abraham
*Assistant Examiner* — Biniam B Asmelash
(74) *Attorney, Agent, or Firm* — McAndrews, Held & Malloy, Ltd.

(57) ABSTRACT

A welding system comprising a user manipulatable device, a proximity sensor positioned on said user manipulatable device, an engine capable of operation in an energy conservation mode and an operating mode, and a generator operatively coupled to the engine. The generator may provide at least one of (1) a welding current output or (2) an auxiliary power output. The engine may operate (1) in the operating mode when the proximity sensor outputs the first output signal, and (2) in the energy conservation mode when the engine is not operating in the operating mode. The proximity sensor may be configured to output the first output signal when an operator of said welding system is in-range.

13 Claims, 5 Drawing Sheets

(56) References Cited

U.S. PATENT DOCUMENTS

| | | | |
|---|---|---|---|
| 2010/0194118 A1* | 8/2010 | Radtke | B23K 9/10 |
| | | | 290/40 B |
| 2012/0312799 A1 | 12/2012 | Cong | |
| 2014/0249557 A1* | 9/2014 | Koch, Jr. | A61B 17/072 |
| | | | 606/170 |
| 2016/0270780 A1* | 9/2016 | Hall | A61B 17/072 |
| 2016/0345260 A1* | 11/2016 | Johnson | H04W 52/0209 |

* cited by examiner

ENERGY CONSERVATION SYSTEM, METHOD, AND APPARATUS FOR USE WITH WELDING EQUIPMENT

BACKGROUND OF THE INVENTION

Welding is a process that has increasingly become ubiquitous in all industries. Welding is, at its core, simply a way of bonding two pieces of metal. While there are other techniques of joining metal (e.g., riveting, brazing, and soldering, for instance), welding has become the method of choice for its strength, efficiency and versatility.

Welding systems can generate a welding current output in excess of 100 amps. Such welding systems typically require a fuel-powered engine to drive an electric generator, which in turn generates the required current for the specific welding operation. The size of the engine and electric generator is dictated by the maximum welding current output rating of the welder. For instance, a welder that is rated to generate a 300-amp, 33.3 volt arc can require 10 kilowatts of power to generate such an arc. Thus, the engine in such a welder must have sufficient horse power to drive an electric generator to generate at least 10 kilowatts of power so as to supply the maximum welding current output rating of the welder at any given time.

As expected, such welding systems can utilize a significant amount of power. Accordingly, there has been a recent push to provide more energy efficient welding systems. To achieve this efficiency objective, it is advantageous to provide welding systems having two or more operating modes, such as an idle mode (i.e., energy conservation mode) and a normal mode (i.e., operation mode). However, a need still remains for an efficient means of dynamically switching between an energy conservation mode and an operation mode, so as to maximize the energy efficiency of such welding systems.

BRIEF SUMMARY

The invention relates to welding systems, welding equipment and welding equipment power supplies. More specifically, the invention relates to an energy conservation system, method, and apparatus for use with welding systems, welding equipment and welding equipment power supplies. Systems, methods, and apparatuses are provided for conserving energy in welding equipment, substantially as illustrated by and/or described in connection with at least one of the figures, as set forth more completely in the claims.

According to a first aspect, a welding system comprises: a user manipulatable device; a proximity sensor positioned on said user manipulatable device, the proximity sensor being configured to provide a first output signal when an operator of said welding system is in-range; an engine capable of operation in an energy conservation mode and an operating mode; and a generator operatively coupled to the engine, wherein the generator provides at least one of (1) a welding current output or (2) an auxiliary power output; wherein the engine operates in the operating mode when the proximity sensor outputs the first output signal, and wherein the engine operates in the energy conservation mode when the engine is not operating in the operating mode. The proximity sensor may also be configured to output a second output signal when the operator is out-of-range, such that the engine operates in the energy conservation mode when the proximity sensor outputs the second output signal.

According to a second aspect, a welding system comprises: an engine capable of operation at a first speed and a second speed; a proximity sensor, the proximity sensor configured to output a first output signal and a second output signal; a generator operatively coupled to the engine, wherein the generator provides at least one of (1) a welding current output or (2) an auxiliary power output; a first engine speed control circuit operatively coupled to said proximity sensor, wherein the first engine speed control circuit provides a first engine speed control signal to the engine such that the engine operates at the first speed when the engine is first started; and a second engine speed control circuit operatively coupled to said proximity sensor, wherein the second engine speed control circuit provides a second engine speed control signal to the engine such that the engine operates at the second engine speed when the proximity sensor outputs the second output signal.

According to a third aspect, a system comprises: a proximity sensor, the proximity sensor being configured to provide a first output signal when an operator of said welding system is in-range; and a power supply, wherein the power supply provides at least one of (1) a welding current output or (2) an auxiliary power output; and wherein the power supply is capable of operation in (1) an operating mode when the proximity sensor outputs the first output signal and (2) an energy conservation mode when the power supply is not operating in the operating mode.

According to a fourth aspect, a method of operating an engine driven generator comprises: receiving a first output signal from a touch sensor positioned on a user manipulatable device associated with the engine driven generator; providing a first engine speed control signal to the engine in response to the first output signal; responsive to the first engine speed control signal, operating the engine at a first speed; receiving a second output signal from the touch sensor; providing a second engine speed control signal to the engine in response to the second output signal; and responsive to the second engine speed control signal, operating the engine at a second speed.

The proximity sensor may be a touch sensor, such as (1) a capacitance touch switch; (2) a resistance touch switch; (3) an inductive touch switch or (4) a piezo touch switch.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION

The present disclosure is directed to systems, methods, and apparatuses for conserving energy in welding equipment. Preferred embodiments of the present invention will be described hereinbelow with reference to the figures of the accompanying drawings. In the following description, wellknown functions or constructions are not described in detail, since such descriptions would obscure the invention in unnecessary detail.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

Figure 1A:
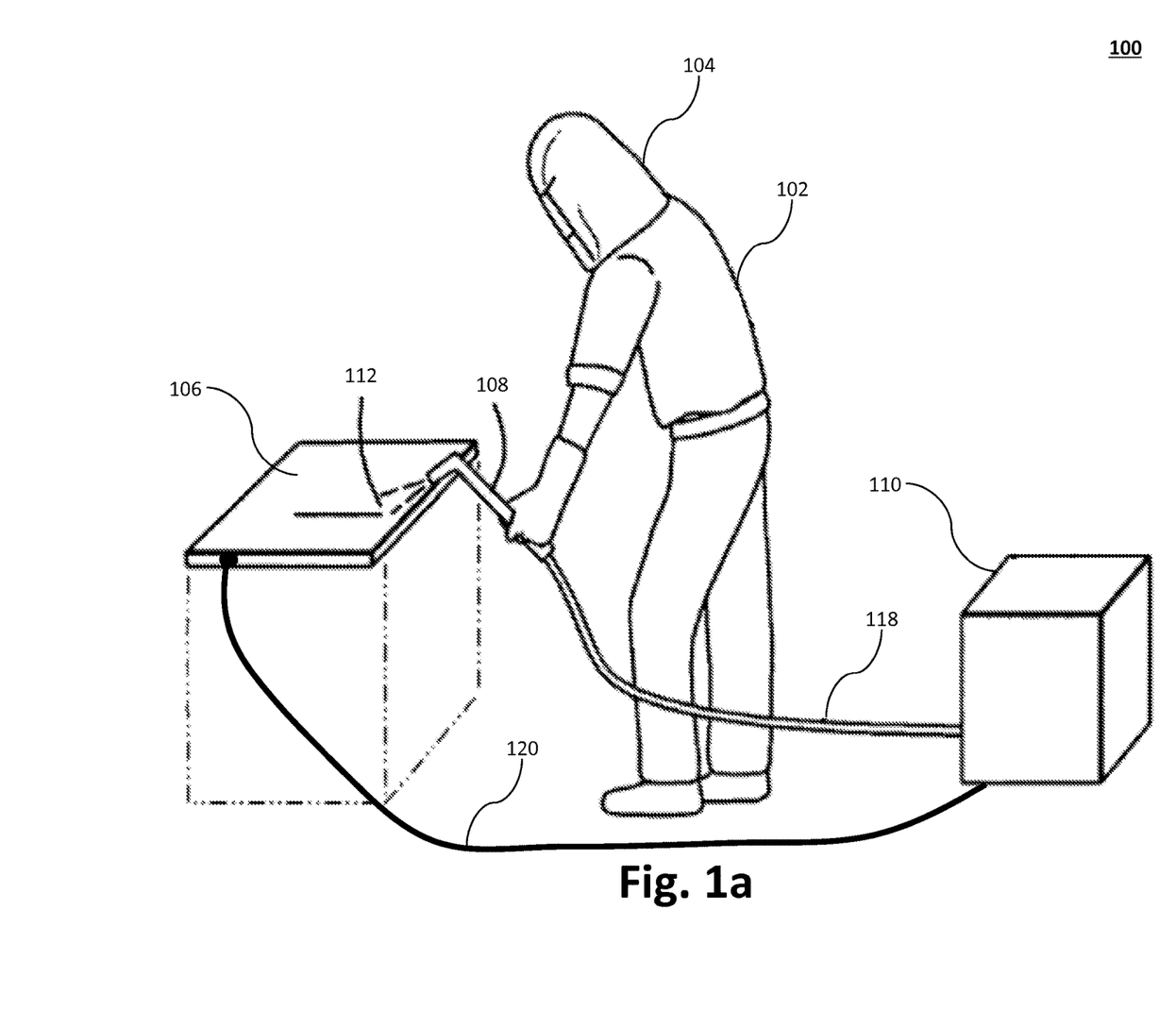
FIGS. 1a and 1b illustrate an exemplary arc welding system in accordance with an aspect of this disclosure.
Figure 1B:
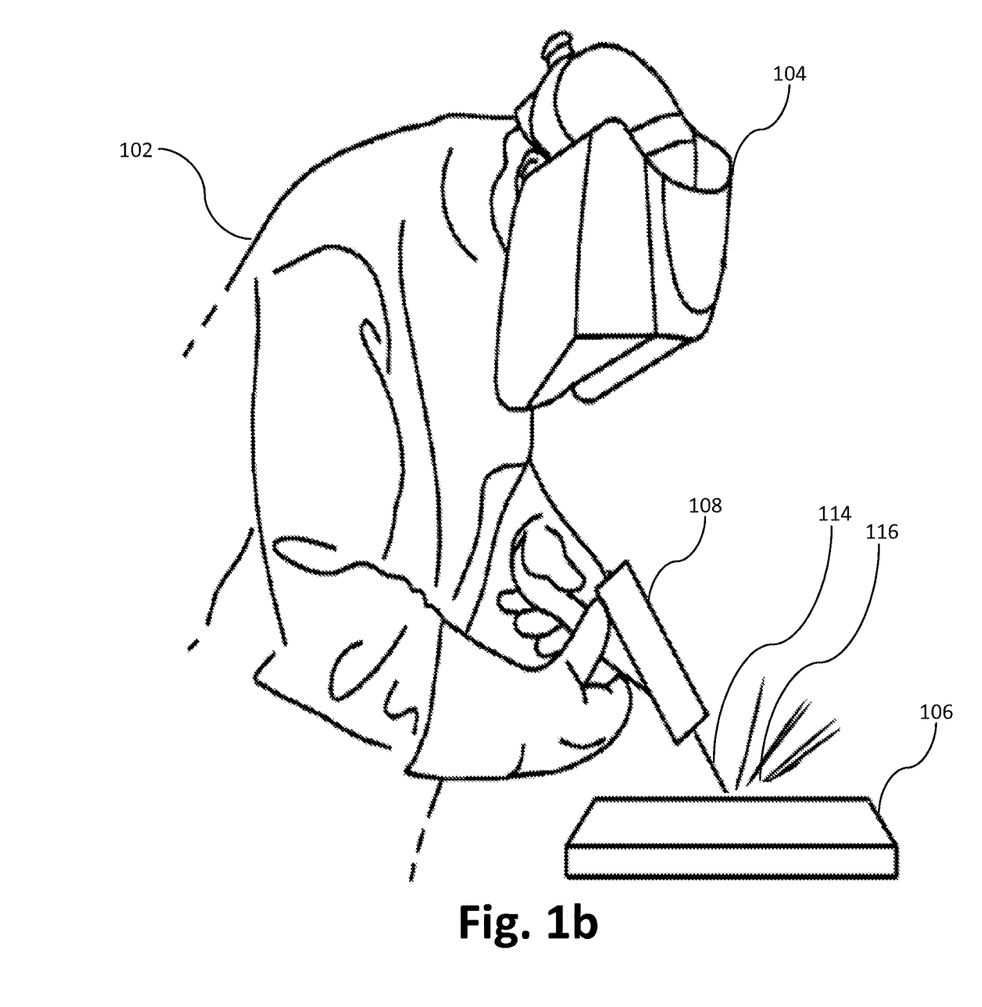

Referring to FIGS. 1a and 1b, an example welding system 100 is shown in which an operator 102 is wearing welding headwear 104 and welding a workpiece 106 using a user manipulatable device (e.g., a torch 108) to which power or fuel is delivered by welding equipment 110 via conduit 118 (for electrical welding, ground conduit 120 provides the return path). The welding equipment 110 may comprise a power or fuel source (generally referred to as a "power supply"), optionally a source of an inert shield gas and, where wire/filler material is to be provided automatically, a wire feeder.

The welding system 100 of FIGS. 1a and 1b may be configured to cut material (e.g., as a plasma cutter) or form a weld joint 112 by any known welding technique, including flame welding techniques (such as oxy-fuel welding) and electric welding techniques (such as shielded metal arc welding (SMAW), more commonly known as stick welding), metal inert gas welding (MIG), flux cored arc welding (FCAW) tungsten inert gas welding (TIG), and resistance welding. TIG welding may involve no external filler metal or may involve manual, automated or semi-automated external metal filler. Optionally in any embodiment, the welding equipment 110 may be arc welding equipment that provides a direct current (DC) or alternating current (AC) to a consumable or non-consumable electrode 114 (better shown in, for example, FIG. 1b) of a user manipulatable device (e.g., torch 108), which may be a TIG torch, a MIG torch, a flux cored torch (commonly called a MIG "gun"), or a stick electrode holder (commonly called a "stinger"). As used herein, the term "user manipulatable device" shall be generally used to refer to an apparatus held, or otherwise manipulated, by the operator when operating a welding system 100, whether a torch, gun, stinger, etc. Moreover, while a torch 108 is illustrated and described in connection with the various examples, the present teachings shall not be limited to a torch, but rather 108, may be applied to any user manipulatable device.

In operation, the electrode 114 delivers the current to the point of welding on the workpiece 106. In the welding system 100, the operator 102 controls the location and operation of the electrode 114 by manipulating the torch 108 and triggering the starting and stopping of the current flow via, for example, a trigger 124. When current is flowing, an arc 116 is developed between the electrode 114 and the workpiece 106. The conduit 118 and the electrode 114 thus deliver current and voltage sufficient to create the electric arc 116 between the electrode 114 and the workpiece. The arc 116 locally melts the workpiece 106 and welding wire (or rod) supplied to the weld joint 112 (the electrode 114 in the case of a consumable electrode, or a separate wire or rod in the case of a non-consumable electrode) at the point of welding between electrode 114 and the workpiece 106, thereby forming a weld joint 112 when the metal cools. A plasma cutter operates in a similar fashion. Specifically, an inert, or semi-inert, gas is blown at high speed out of a nozzle 128, while an electrical arc is formed through that gas from the nozzle 128 to the workpiece 106 being cut, turning some of that gas to plasma. The plasma is hot enough to melt the workpiece 106 being cut and moves fast enough to blow molten material away from the cut.

Figure 1C:
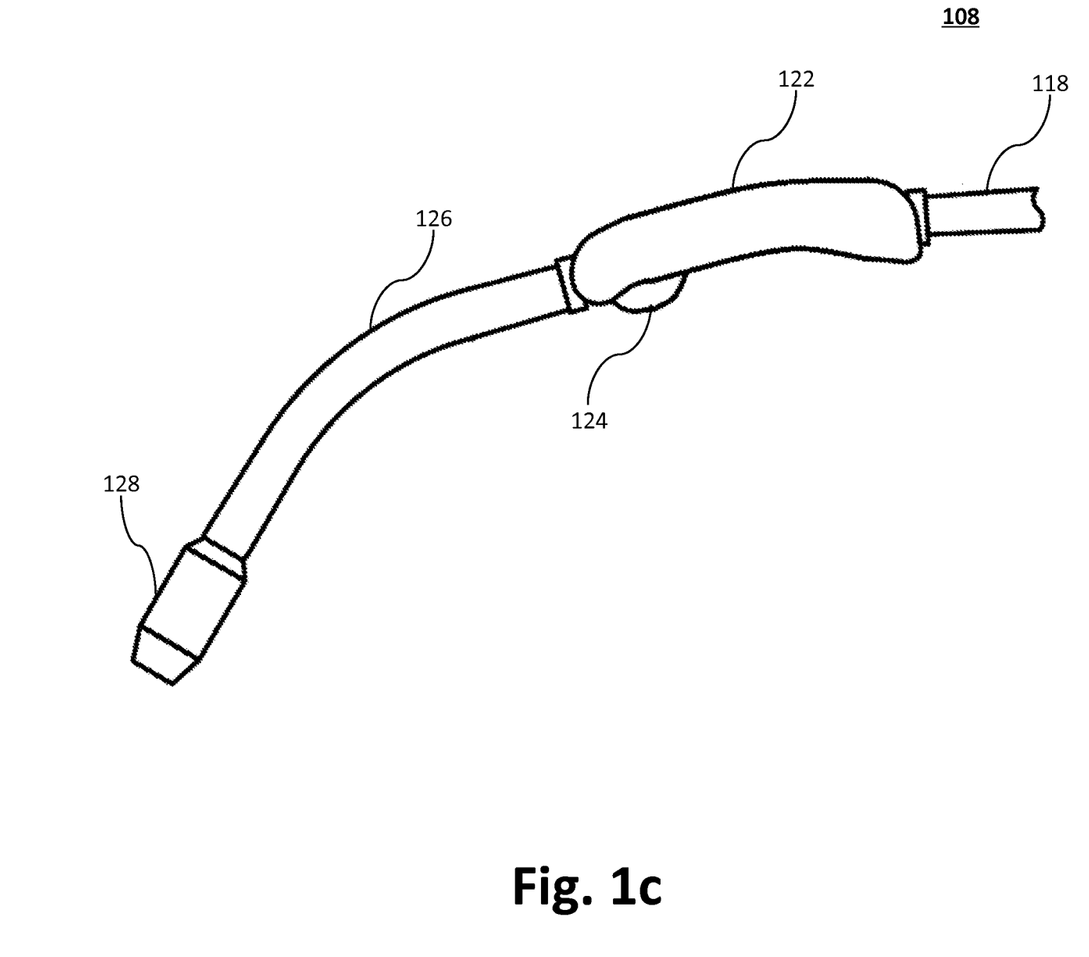
FIG. 1c illustrates an exemplary user manipulatable device for use with an arc welding system in accordance with an aspect of this disclosure.

FIG. 1c illustrates an enlarged diagram of an exemplary user manipulatable device, specifically, a torch 108. As illustrated, the torch 108 generally comprises a handle 122, a trigger 124, a conductor tube 126, and a nozzle 128 at the distal end of the conductor tube 126. Applying pressure to the trigger 124 (i.e., actuating the trigger) initiates the welding (or cutting, where applicable) process, whereby output power is provided, and the wire feeder 214, and/or the gas supply 216 are activated as needed.

Figure 2:
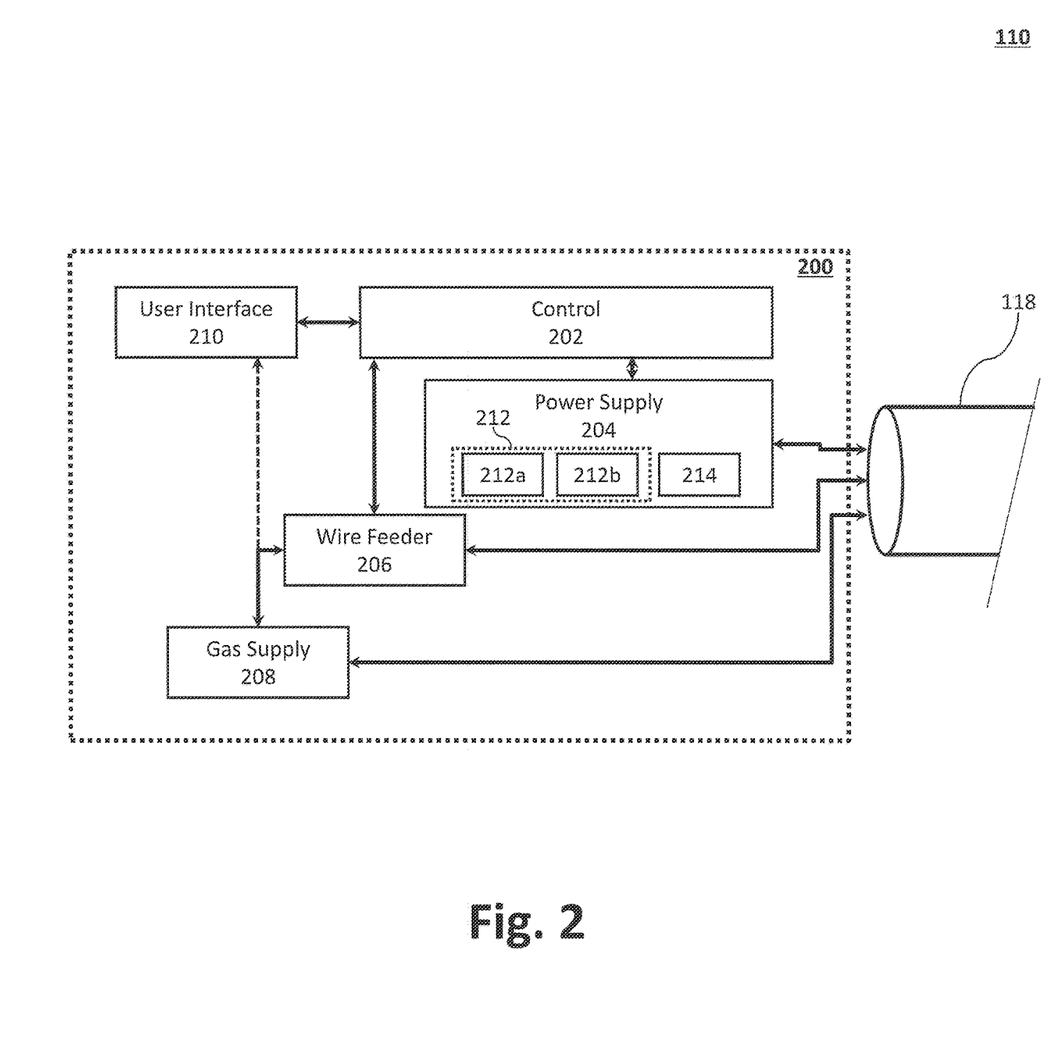
FIG. 2 illustrates example welding equipment in accordance with an aspect of this disclosure.

FIG. 2 illustrates a block diagram 200 of exemplary welding equipment 110 in accordance with an aspect of this disclosure. As illustrated, the welding equipment 110 of FIG. 2 generally comprises an operator interface module 210, control circuitry 202, power supply circuitry 204, a wire feeder module 206, and a gas supply module 208.

The operator interface module 210 may comprise electromechanical interface components (e.g., screen, speakers, microphone, buttons/switches, touchscreen, etc.) and associated drive circuitry. The operator interface 208 may generate electrical signals in response to operator input (e.g., screen touches, button/switch presses, voice commands, remote sensor input, etc.). Driver circuitry of the operator interface module 210 may condition (e.g., amplify, digitize, etc.) the signals and them to the control circuitry 202. The operator interface 208 may generate audible, visual, and/or tactile output (e.g., via speakers, a display, and/or motors/actuators/servos/etc.) in response to signals from the control circuitry 202. In certain aspects, one or more components of the operator interface module 210 may be positioned on the user manipulatable device, whereby control signals from the one or more components are communicated to the control circuitry 202 via conduit 118.

The control circuitry 202 comprises circuitry (e.g., a microcontroller and memory) operable to process data from the operator interface 208, the power supply 212, the wire feeder 214, and/or the gas supply 216; and to output data and/or control signals to the operator interface 208, the power supply 212, the wire feeder 214, and/or the gas supply 216. For instance, the control circuitry 202 may be operatively coupled with an engine (or motor) speed control circuit and/or transformer control circuit.

The gas supply module 208 is configured to provide gas (e.g., shielding gas) via conduit 118 for use during the welding or cutting process. Shielding gases are generally inert, or semi-inert, gases used in several welding processes, most notably gas metal arc welding and gas tungsten arc welding (e.g., MIG and TIG). A purpose of shielding gases is to protect the weld area from oxygen, and water vapor. Depending on the materials being welded, these atmospheric gases can reduce the quality of the weld or make the welding more difficult. The gas supply module 208 may comprise an electrically controlled valve for controlling the rate of gas flow. The valve may be controlled by a control signal from control circuitry 202 (which may be routed through the wire feeder 214, or come directly from the control circuitry 202). The gas supply module 208 may also comprise circuitry for reporting the present gas flow rate to the control circuitry 202. In terms of plasma cutters, the gas supply module 208 may be configured to provide gas for cutting purposes.

In an example implementation, the gas supply module 208 may comprise circuitry and/or mechanical components for measuring the gas flow rate such that the reported flow rate is an actual flow value and not simply an expected flow value based on calibration, thereby providing increased reliability and accuracy. While a gas supply module 208 is illustrated, certain welding processes can use other methods of protecting the weld from the atmosphere. For example, shielded metal arc welding uses an electrode covered in a flux that produces carbon dioxide when consumed, a semi-inert gas that is an acceptable shielding gas for welding steel. Thus, the gas supply module 208 need not be used for all welding techniques, and, in such cases, need not be present in the welding equipment 110.

The wire feeder module 206 is configured to deliver a consumable wire electrode 114 to the weld joint 112. The wire feeder 214 may comprise, for example, a spool for holding the wire, an actuator for pulling wire off the spool to deliver to the weld joint 112, and circuitry for controlling the rate at which the actuator delivers the wire. The actuator may be controlled based on a control signal from the control circuitry 202. The wire feeder module 206 may also comprise circuitry for reporting the present wire speed and/or amount of wire remaining to the control circuitry 202. In an example implementation, the wire feeder module 206 may comprise circuitry and/or mechanical components for measuring the wire speed, such that reported speed is an actual speed, and not simply an expected value based on calibration, thereby providing increased reliability. For TIG or stick welding, the wire feeder 214 may not be used (or may not even be present in the welding equipment 110).

The power supply circuitry 204 comprises circuitry for generating (or otherwise providing) power to be delivered to a welding electrode via conduit 118. The power supply circuitry 204 may comprise, for example, one or more generators, voltage regulators, current regulators, inverters, and/or the like. The voltage and/or current output by the power supply circuitry 204 may be controlled by a control signal from the control circuitry 202.

The power supply circuitry 204 may be, for example, a transformer-style power supply or a generator-style power supply, which converts mechanical energy into electrical energy. Indeed, the power supply circuitry 204 may be coupled to a dedicated engine driven generator 212 (e.g. an engine 212*a* coupled to a generator 212*b*), or the engine driven generator 212 may be integrated with the welding equipment 110. That is, provided as a single housing. Examples of such welding equipment 110 having an integrated engine driven generator are available from Miller Electric, of Appleton, Wis. Thus, the power supply circuitry 204's power may be derived either from a transformer 214, a generator 212, or combination thereof. As used herein, the terms "welding current output" refers to a current/voltage supply, or signals, suitable for welding, induction heating, plasma cutting, air carbon arc cutting, etc.

A transformer-style power supply, for example, converts a moderate voltage and moderate current supply from the utility mains (e.g., 230 or 115 VAC) into a high current and low voltage supply, typically between 17 to 45 (open-circuit) volts and 55 to 590 amperes. In certain configurations, a rectifier may be provided to convert the AC into DC. A transformer-style design typically allows the operator to select the output current by, for example, selectively moving a primary winding closer or farther from a secondary winding, moving a magnetic shunt in and out of the core of the transformer, using a series saturating reactor with a variable saturating technique in series with the secondary current output, or by simply permitting the operator to select the output voltage from a set of taps on the transformer's secondary winding. Pure transformer style machines are typically less expensive, but are generally larger and bulkier because they operate at the utility mains frequency of 50 or 60 Hz. As a result, such low frequency transformers must have a high magnetizing inductance to avoid wasteful shunt currents.

A generator-style power supply, on the other hand, uses generators, or alternators, to convert mechanical energy into electrical energy. For example, an internal combustion engine may be used, but electric motors may also be used to drive an alternator or generator, in which case the utility power is converted first into mechanical energy, and then back into electrical energy to achieve the step-down effect similar to a transformer. Because the output of the generator can be direct current, or even a higher frequency AC current, these machines can produce DC from AC without any need for rectifiers of any type, or can also be used for implementing formerly-used variations on TIG welders, where the need for a higher frequency add-on module box is avoided by the alternator simply producing higher frequency AC current directly. In certain aspects, the generator may provide an auxiliary power output (typically 120 or 240 volt 60 Hz ac signal or a 220 volt 50 Hz ac signal) for operating various other devices including power tools, lights, etc. In such a configuration, the control circuitry 202 may be operatively coupled with an engine speed control circuit, whereby the control circuitry 202 instructs the engine speed control circuit to output a particular engine speed control signal, which could dictate the engine speed, or other operation.

Regardless of the type of power supply, the power supply circuitry 204 may also comprise circuitry for reporting the present current and/or voltage of the welding current output to the control circuitry 202. In an example implementation, the power supply circuitry 204 may comprise circuitry for measuring the voltage and/or current on the conduit 118 (at either or both ends of the conduit 118) such that reported voltage and/or current is an actual value and not simply an expected value based on calibration.

To conserve energy, the power supply circuitry 204 may be configured to selectively operate the welding equipment 110 in either an operation mode or an energy conservation mode. The presently disclosed system and techniques for dynamically switching between an operation mode and an energy conservation mode achieve energy conservation requirements, while also enabling operators to conserve energy costs. The various teachings may be employed in connection with any form of welding apparatuses and systems, whether a welder, plasma cutter, or the like, including, without limitation, gas metal arc welding (GMAW), Gas tungsten arc welding (GTAW), shielded metal arc welding (SMAW), etc.

During the energy conservation mode, one or more non-essential power-drawing features, components, or circuits, may be disabled or otherwise reduced to limited operation. For example, the control circuitry 202 may cause the generator's internal combustion engine, or motor, to switch from an operation mode (e.g., run speed, which may be close to or at full throttle) to an energy conservation mode (e.g., idle speed). Thus, the control circuitry 202 may instruct an engine speed control circuit to output a first engine speed control signal to the engine such that the engine operates at a first speed (e.g., operation mode) when the engine is first started and/or when certain conditions are met, and a second engine speed control signal to the engine when other conditions are met, such that the engine operates at the second engine speed (e.g., energy conservation mode).

The engine speed control circuit may be a single circuit, or two separate circuits. The engine speed control circuit may even be integrated with the control circuitry 202. In another example, a solenoid may be used to move a lever on the engine or motor to a desired position. The control circuitry 202 may therefore control at least one of a throttle position, a fuel pump, an injection timer, a fuel to air ratio, fuel consumption, and ignition timing. For example, U.S. Pat. No. 6,603,097 to John C. Leisner and entitled "Method and Apparatus for Controlling Engine Speed of a Welding Generator," describes a generator having two or more operating modes. Similarly, with regard to transformer-style power supplies, the control circuitry 202 may disable or adjust the transformer output to provide only sufficient power to operate essential components, which may include, for example, the control circuitry 202 and operator interface module 210.

Further, auxiliary features may be configured to run only when the welding equipment 110 is in operation (i.e., during welding), and not continuously. For example, the cooling system may be disabled during an energy conservation mode. Moreover, in dirty or dusty environments, such a feature also reduces the amount of airborne contaminants pulled through the machine, thereby keeping internal components cleaner and reducing the need for maintenance.

Each of the operation mode and the energy conservation mode may be divided into a plurality of sub-modes, each having varying degrees of operation. For example, a partial energy conservation mode may be employed that provides greater functionality during idle (e.g., more features) than a full energy conservation mode (where all non-essential operations may be disabled), but at the cost of a greater energy expenditure. Similarly, the operation mode may provide a basic operation mode for typical projects (or average use), or an overdrive operation mode for materials, or operations, that require a higher welding current output.

In certain aspects, the internal combustion engine (or other power source) may be fully deactivated when in the energy conservation mode. For example, by shutting off the internal combustion engine, no fuel would be consumed during the energy conservation mode. In such configurations, however, an auxiliary power source may be needed to power the control circuitry 202, or other essential equipment or modules, that would enable the welding equipment 110 to revert to the operation mode (e.g., in this case, the internal combustion engine would start again). The auxiliary power source may be, for example, a battery (e.g., a rechargeable battery, such as lead acid, lithium ion, etc.) or a super capacitor (e.g., electric double-layer capacitor (EDLC)).

An energy conservation mode may be triggered by one or more idle triggering events. Examples of such idle triggering events are, inter alia, the expiration of a timer (e.g., indicating that the device has not been used for a predetermined amount of time), or activation (or deactivation) one or more other sensors or switches. For example, the energy conservation mode may be simply selected via the operator interface module 210 using a button or switch, or, as will be described below, a proximity sensor. Upon detection of an idle triggering event, the control circuitry 202 switches the power supply circuitry 204 to an energy conservation mode. Rather than a single triggering event (e.g., a timer expiration flag), the control circuitry 202 may retain the power supply circuitry 204 in the operation mode only while a certain condition is met. For example, so long as a sensor outputs a predetermined output signal (e.g., indicating detection of a particular object), the control circuitry 202 will retain the power supply circuitry 204 the operation mode; otherwise, the power supply circuitry 204 will revert to an energy conservation mode. During the energy conservation mode, control circuitry 202 may continue to monitor for any state changes since the idle triggering event, which would indicate that the welding equipment 110 may be imminently used.

As will be appreciated, it is desirable to operate the welding equipment 110 in an energy conservation mode as often as is possible, thereby maximizing energy conservation. Thus, unless the user manipulatable device is being used, or held, by the operator, or is in an immediate proximity to the operator, the welding equipment 110 may operate in an energy conservation mode. Indeed, reliance on only timer-based idle triggering events is generally less efficient than employing sensors capable of providing dynamic use information, such as is possible using proximity sensors. Thus, to achieve maximum energy conservation, one or more proximity sensors may be provided on the welding equipment 110 or the torch 108, such as handle 122 and/or a trigger 124. Specifically, one or more proximity sensors may be positioned on the torch 108 to indicate to the control circuitry 202 when the operator is no longer using the welding equipment 110. For example, the proximity sensor may be configured to output a first output signal (e.g., a trigger signal) indicating that the operator is in-range (e.g., touching the torch 108 and/or within a predetermined distance of the welding equipment 110 or the torch 108) and/or a second output signal indicating that the operator is out-of-range (e.g., not touching the torch 108 and/or not within a predetermined distance of the welding equipment 110 or the torch 108). In certain aspects, the second output signal may simply be the nonexistence of a first output signal.

In other words, when an operator removes his or her hand from the torch 108, the proximity sensor no longer outputs the first output signal to the power supply circuitry 204 (and/or optionally outputs a second output signal to the power supply circuitry 204), which causes the welding equipment 110 to enter the energy conservation mode. The reverse of this process may be employed when the operator once again reaches for the torch 108 and the proximity sensor outputs the first output signal, which causes the welding equipment 110 to enter the regular operation mode. That is, upon detection of the operator at the one or more proximity sensors via the control circuitry 202, the welding equipment 110 will automatically revert to a regular operation mode (i.e., "ready" state) as the operator touches (or otherwise grasps) the torch 108.

Depending on processor speed, the welding equipment 110 can revert from the energy conservation mode to the regular operation mode within tenths or hundredths of a millisecond, which is faster than it would take for the operator to grasp the torch and attempt to start a weld. While energy conservation is a major consideration, a safety benefit also exists. For example, if an operator drops the torch 108, the proximity sensor can be used to determine that the torch 108 is no longer under control of said operator and extinguish (e.g., shut off the output) the arc. In certain aspects, additional sensors may be provided to monitor operation of the welding equipment 110. For example, a light sensor may be further provided near the nozzle 128 of the torch 108 to detect whether or not the welder is in use, or has been used within a predetermined timed period. An example system is provided by U.S. Pat. No. 7,564,014 to Moon Young Huh.

The proximity sensor may be adjusted to a very short range so as to operate as a touch switch (e.g., a touch sensor on the torch 108), or to a longer range sensor to detect whether the operator is merely within a predetermined distance of the welding equipment 110 (or the torch 108). Thus, the proximity sensor can be either a touch sensor, or a proximity sensor positioned on the welding equipment 110 or the torch 108 that is configured to detect the operator, or a transmitter positioned on the operator's person, whereby the operator must be within a predetermined distance of the welding equipment 110 (or the torch 108) to enter a regular operation mode.

Suitable touch switches includes, inter alia, capacitance touch switches, resistive switches, inductive touch switches, and piezo touch switches, but other proximity sensors are possible. The capacitance touch switch electrode can be placed behind a non-conductive panel such as wood, glass, or plastic, thereby enabling the handle 122 and/or a trigger 124 to be fabricated from plastic, and enabling the operator to wear gloves. The capacitance touch switch works by detecting the operator's body capacitance. When the operator touches the capacitance touch switch, it increases the capacitance and triggers the capacitance touch switch. The capacitance touch switch may be provided as an integrated circuit.

A capacitance touch switch is advantageous in that it requires only one electrode to function. For example, the electrode may be positioned on the handle 122 of the torch 108 to detect that the operator is holding the torch 108. Alternatively, the electrode may be positioned on the trigger 124 to detect that the operator is not only holding the torch 108, but is about to activate the torch 108. In fact, multiple electrodes may be provided on the torch 108 to achieve a particular need. For example, a first electrode may be positioned on the trigger 124, and a second may be provided on the handle 122, thereby detecting that, not only is the torch being held, but that the operator is holding it in a safe/proper manner. In such an example, each of the electrodes may need to be actuated (e.g., touched) in order for the welding equipment 110 to enter regular operation mode for operation. An inductive touch switch is similar to capacitive touch switch, but employs a different type of sensor (e.g., a trace coil) and measures inductance instead of capacitance. An inductive touch switch measures the change in inductance of the sensor due to the deflection of a top plate (e.g., a metal plate).

A resistance touch switch, on the other hand, would require that two electrodes be physically in contact with something electrically conductive (for example the operators finger/hand) to operate. This is because resistance touch switches operate by lowering the resistance between two pieces of metal, which is much simpler in construction compared to the capacitance touch switch. Thus, placing one or two fingers across the plates achieves a turn on (or closed state), while removing the finger(s) from the metal pieces turns the device off. In this example, both electrodes may be positioned on the trigger 124, such that the users finger activates the welding equipment 110, or on the handle 122. In another example, a first electrode may be positioned on the trigger 124, and the second may be provided on the handle 122, thereby detecting that, not only is the torch 108 being held, but that the operator is holding it in the safe/proper manner.

Finally, a piezo touch switch may be positioned on the torch 108. Piezo touch switches operate using the mechanical bending properties of piezo materials (e.g., piezo ceramic disk or other shape), which may be positioned behind a surface. A force imparted on the piezo material causes a voltage to be induced due to a charge transfer. The voltage generated is converted by the electronic connection into a polarity-neutral, electronic switch contact. Piezo touch switches are advantageous in that they enable touch interfaces with any kind of material.

As will be appreciated, a touch sensor provides greater accuracy in that it requires direct contact with the torch 108 by the operator. However, a longer range proximity sensor positioned on the welding equipment 110, or the torch 108, may be beneficial when the operator is wearing clothing, gloves, or other materials that prohibit direct (or otherwise operable contact) with the welding equipment 110 or the torch 108. Thus, another possible proximity sensor may be radio-frequency identification (RFID), which is the wireless use of electromagnetic fields to transfer data. In such an embodiment, an RFID tag may be coupled to the operator that is configured to communicate with the welding equipment 110. For example, the operator may be equipped with an RFID transmitter or tag (e.g., a bracelet, ID badge, etc.) and the welding equipment 110 may be equipped with a corresponding RFID receiver. In such an embodiment, the welding equipment 110 may operate only when the user is within a predetermined distance of the welding equipment 110. However, such an arrangement would be less efficient than the above-described touch sensors since the operator may be within the predetermined distance, but not actually using the welding equipment 110. Such a configuration would also prohibit use of the welding equipment by unauthorized personnel. Thus, an RFID tag may be used in addition to, or in lieu of, touch sensors.

In another example, the welding equipment 110 may be configured to operate such that the power supply (e.g., an engine driven generator) is started (or otherwise turned on) when an operator is within a first predetermined distance of the welding equipment 110, and the power supply comes up to speed when the operator is within a second predetermined distance of the welding equipment 110. For example, the engine may start when the welding equipment 110 determines that the operator is near the welding equipment 110 using, for example, RFID technology (or another radio transmitter/receiver), and enters the operating mode when the operator touches the user manipulatable device.

To prevent the power supply circuitry 204 from erroneously switching between an energy conservation mode and an operating mode, a timer may be used to require a time delay before the power supply circuitry 204 can switch between power supply modes. For example, such a timer can mitigate undesired mode changes when, for example, the operator merely transitions the torch 108 from one hand to another. The timer would also mitigate momentary, or erroneous, signals from a proximity sensor. The length of the time delay may be operator selectable and on the order of seconds or even milliseconds. For example, the operator may set a desired time delay via the operator interface module 210. In addition to, or in lieu of, the proximity sensors, a blind timing scheme may be used to determine that the machine has not been used for some time. Similarly, a switch may be positioned on the torch (e.g., a pushbutton, which operates as a dead man switch) could be used to accomplish this task. Finally, an accelerometer could be used to determine if the torch is in free fall and shut off the arc.

Figure 3:
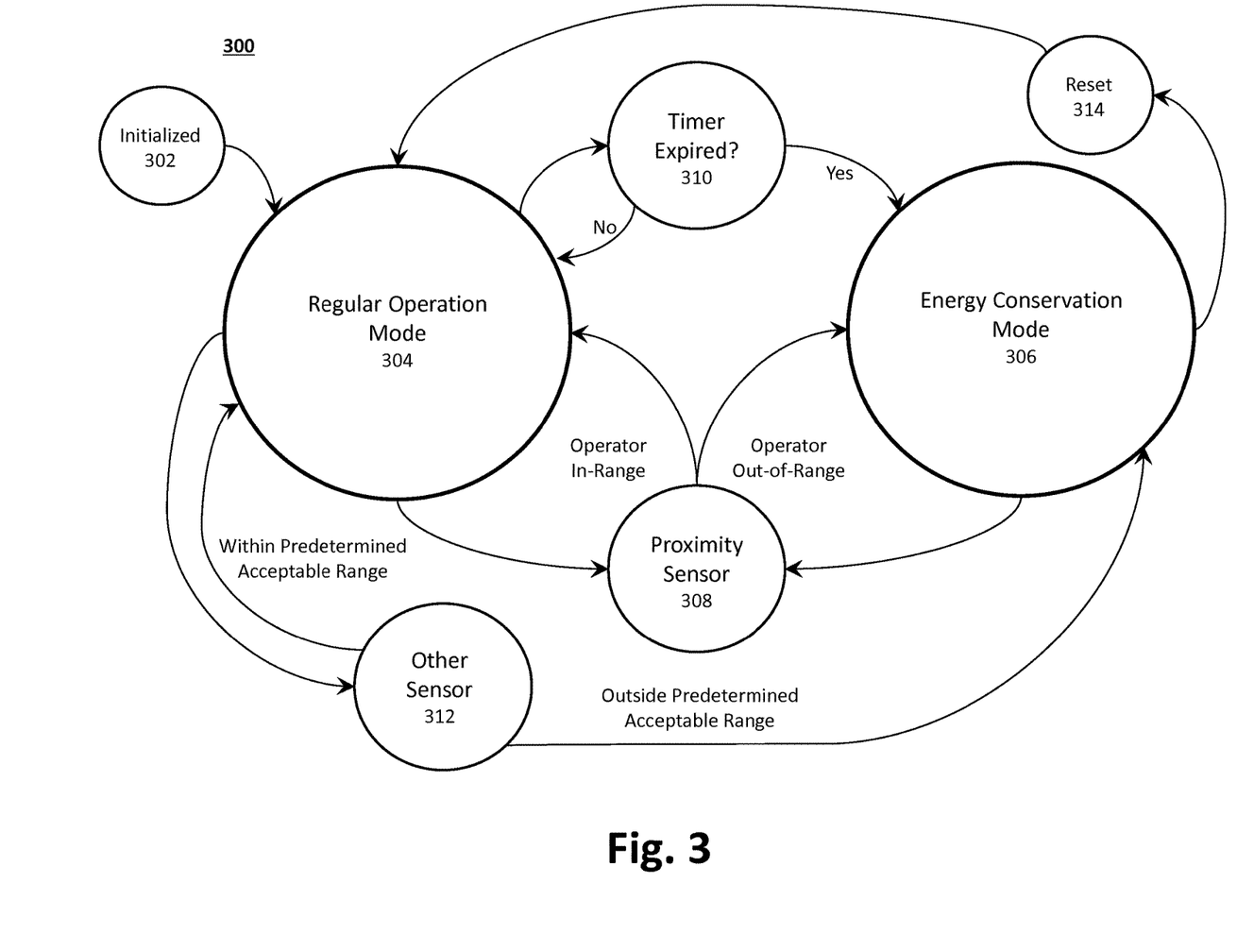
FIG. 3 illustrates an exemplary state diagram of two welding equipment states in accordance with an aspect of this disclosure.

FIG. 3 illustrates an exemplary state diagram 300 of two welding equipment states. Once the welding equipment 110 has been initialized at 302, the control circuitry 202 may automatically make a determination the welding equipment 110 should operate in either a regular operation mode 304 or an energy conservation mode 306. In certain aspects, the regular operation mode 304 may be the default mode. The determination may be based upon the status of one or more proximity sensors 308. For example, if one or more of the proximity sensors 308 indicate that the operator is in-range, the welding equipment 110 will operate in the regular operation mode 304. However, if the proximity sensors 308 indicate that the operator is out-of-range, the welding equipment 110 will operate in the energy conservation mode 306.

The proximity sensors 308 may deem that the operator is in-range when, for example, the operator contacts (e.g., touches) a touch sensor provided on the torch 108, and/or the operator (or a transmitter associated with the operator) is within a predetermined distance of the welding equipment 110. Conversely, the proximity sensors 308 may deem that the operator is out-of-range when, for example, the operator is not touching a touch sensor provided on the torch 108, and the operator (or a transmitter associated with the operator) is not within a predetermined distance of the welding equipment 110.

In certain aspects, the control circuitry 202 may make a determination that the welding equipment 110 should operate in the regular operation mode 304 or the energy conservation mode 306 based upon the status of an idle timer 310. For example, if the idle timer 310 indicates that a predetermined amount of idle time has elapsed since the welding equipment 110 was last used (e.g., an arc was generated, or the trigger 124 was actuated). If the idle timer 310 indicates expiration of the predetermined amount of idle time, the welding equipment 110 will operate in the energy conservation mode 306 until the welding equipment 110 again becomes active (e.g., the trigger 124 is actuated). The predetermined amount of time may be operator selectable. For example, the operator may set a desired time delay via the operator interface module 210. The predetermined amount of idle time may be, for example, between about 5 and 300 seconds, more preferably about 5 to 90 seconds, and most preferably 5 to 60 seconds. Thus, the welding equipment 110 may be configured to enter the energy conservation mode 306 even when the operator is in-range, but the welding equipment 110 has not been used within a predetermined amount of time.

In certain other aspects, the control circuitry 202 may determine that the welding equipment 110 should operate in either the regular operation mode 304 or the energy conservation mode 306 based upon the status of one or more other sensors 312. For example, an accelerometer may be used to determine whether the torch 108 is in a free fall, in which case the welding equipment 110 would enter the energy conservation mode 306, thereby shutting off the arc and mitigating safety hazards. That is, if the proper acceleration (more commonly known as "G-force") measured by the accelerometer deviates from a predetermined acceptable range, the control circuitry 202 may cause the welding equipment 110 to enter energy conservation mode 306. A reset trigger 314 (e.g., button, timer, remote reset signal, etc.) may also be provided to return to the regular operation mode 304 from the energy conservation mode 306.

While an accelerometer is provided as an example, other sensors may be used to enhance safety. For example, a thermostat may be provided to indicate any overheating, while a moisture sensor may be provided to indicate fluid, which could pose an electrical shorting hazard. In certain aspects, the welding equipment 110 may automatically return to the regular operation mode 304 when the measured value returns to the predetermined acceptable range (e.g., the device cools off), or upon reset 314.

The welding equipment 110 may also be configured to receive (whether wirelessly or via a wired connection) a remote signal instructing the welder to enter the energy conservation mode 306. Thus, when wireless monitoring or control is desired, the welding equipment 110 may further comprise an antenna, a communication port, and any communication interface circuitry. The antenna may be any type of antenna suited for the frequencies, power levels, etc. used by a communication link. The communication port may comprise, for example, an Ethernet over twisted pair port, a USB port, an HDMI port, a passive optical network (PON) port, and/or any other suitable port for interfacing with a wired or optical cable. The communication interface circuitry is operable to interface the control circuitry to the antenna and/or port for transmit and receive operations. For transmit, the communication interface may receive data from the control circuitry and packetize the data and convert the data to physical layer signals in accordance with protocols in use on the communication link. For receive, the communication interface may receive physical layer signals via the antenna or port, recover data from the received physical layer signals (demodulate, decode, etc.), and provide the data to control circuitry.

The present methods and systems may be realized in hardware, software, or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the invention as defined by the following claims. While the proximity sensors are described as being employed in connection with a welding apparatus and system, the teachings may be similarly applied to other devices where it is desirous to determine whether an operator is in-range of a particular device or piece of machinery. Moreover, the teachings may be similarly applied to other devices where it is desirous to switch between an operating mode and an energy conservation mode. For example, a battery charger may be configured to enter an operating mode (or, at minimum, exit energy conservation mode) upon contact with the operator (e.g., via its battery clamps).

All documents cited herein, including journal articles or abstracts, published or corresponding U.S. or foreign patent applications, issued or foreign patents, or any other documents are each entirely incorporated by reference herein, including all data, tables, figures, and text presented in the cited documents.

What is claimed is:

1. A welding system comprising:
    control circuitry operatively coupled with a trigger and a proximity sensor,
        wherein the trigger is positioned on a welding torch and is configured to provide a control signal upon actuation by an operator of the welding system, and
        wherein the proximity sensor is positioned on the welding torch and is configured to provide a first output signal while the proximity sensor detects that the operator is in-range of the welding torch;
    an engine operatively coupled with the control circuitry, the engine being capable of operation in an energy conservation mode and an operating mode,
        wherein the engine operates in the operating mode when the proximity sensor provides the first output signal to the control circuitry, and
        wherein the engine operates in the energy conservation mode when the engine is operational and not operating in the operating mode; and
    a generator operatively coupled to the engine and configured to supply power to welding circuitry,
        wherein the welding circuitry is configured to provide when the proximity sensor provides the first output signal to the control circuitry, a welding current output in response to the control signal, and
        wherein the control circuitry is configured to disable at least one power-drawing circuit of the welding circuitry when the proximity sensor does not provide the first output signal to the control circuitry.

2. The welding system of claim 1, wherein the proximity sensor is configured to provide a second output signal when the operator is out-of-range.

3. The welding system of claim 2, wherein the engine operates in the energy conservation mode when the proximity sensor provides the second output signal.

4. The welding system of claim 1, wherein the proximity sensor is an RFID reader to determine whether an RFID tag associated with the operator is within a predetermined distance of the welding torch.

5. The welding system of claim 4, wherein the RFID tag is a bracelet or an ID badge.

6. The welding system of claim 1, wherein the proximity sensor is an accelerometer to determine whether the welding torch is in free fall.

7. The welding system of claim 1, wherein the welding torch includes a handle, the proximity sensor being positioned on the handle.

8. The welding system of claim 1, wherein the proximity sensor is positioned on the trigger.

9. The welding system of claim 1, wherein the control circuitry is coupled to a timer and the control circuitry is configured to switch the engine between the operating mode and the energy conservation mode as a function of the first output signal and the timer.

10. The welding system of claim 8, wherein the control circuitry is configured to operate the engine in the operating mode for a predetermine period of time after the proximity sensor terminates the first output signal.

11. The welding system of claim 1, wherein the engine is configured to operate at a first speed during the energy conservation mode and at a second speed during the operation mode, the second speed being greater than the first speeds.

12. The welding system of claim 11, wherein the first speed is an idle speed.

13. The welding system of claim 12, wherein the second speed is a run speed.

* * * * *